United States Patent [19]
Verney

[11] Patent Number: 4,779,942
[45] Date of Patent: Oct. 25, 1988

[54] NVG COMPATIBLE RED LIGHT

[75] Inventor: Jay F. Verney, Guilford, Conn.

[73] Assignee: United Technologies Corporation, Hartford, Conn.

[21] Appl. No.: 806,301

[22] Filed: Dec. 9, 1985

[51] Int. Cl.⁴ ............................................. G02B 5/22
[52] U.S. Cl. .................................. 350/1.1; 350/311; 250/213 VT
[58] Field of Search ............... 350/1.4, 439, 166, 1.1, 350/311; 250/213 VT; 358/42

[56] References Cited

U.S. PATENT DOCUMENTS

| | | | |
|---|---|---|---|
| 3,858,977 | 1/1975 | Baird et al. ......................... | 350/166 |
| 4,068,260 | 1/1978 | Ohneda et al. ..................... | 350/166 |
| 4,179,181 | 12/1979 | Chang .................................. | 350/166 |
| 4,370,025 | 1/1983 | Sato et al. .......................... | 350/166 |
| 4,376,889 | 6/1987 | Swift ................................... | 350/439 |
| 4,395,629 | 7/1983 | Sasano et al. ...................... | 350/166 |
| 4,556,599 | 12/1985 | Sato et al. .......................... | 350/166 |

*Primary Examiner*—Bruce Y. Arnold
*Assistant Examiner*—Terry S. Callaghan

[57] ABSTRACT

Night Vision Goggle compatible red lighting in which the red light does not adversely affect the gain of the night vision goggles yet is visible to the unaided eye. The red light is filtered by a filter which transmits at least about 80% of the visible spectrum within a range up to about 640 nanometers in wavelength and inhibits the transmission of 99.9% of said red light above about 720 nanometers in wavelength on the electromagnetic spectrum within the spectral sensitivity of the night vision goggles.

3 Claims, 3 Drawing Sheets

NVG COMPATIBLE RED LIGHT

This invention was made with Government support under a contract awarded by the Department of the Army. The Government has certain rights in this invention. The Government has rights in this invention pursuant to Contract No. DAAJ09-82-G-0002 awarded by the Department of the Army.

TECHNICAL FIELD

The field of art to which this invention pertains is night vision goggles and particularly sources of light to use with night vision goggles.

BACKGROUND OF THE INVENTION

Night Vision Goggles (NVGs) are devices which enable an aircraft pilot to see images at nighttime illumination levels as low as overcast starlight ambient conditions. All objects radiate and/or reflect energy, however, only a portion of the energy is visible to the unaided eye (i.e., visible spectrum emissions between 360 to 760 nanometers (nm) in wavelength on the electromagnetic spectrum) and at night these energy levels are unviewably low. The ability to sense low level radiant emissions is made possible through the use of NVGs. This capability is achieved by a two-step energy conversion process (light energy to electricity followed by electricity into light) in which the energy received is increased by a factor of 10,000 to 20,000 at maximum sensitivity. This is commonly referred to as the gain or image intensification of the NVG.

The range of NVG spectral sensitivity is limited to 600 nm to 950 nm which encompasses a sector of the visible light spectrum (600 nm to 760 nm) to permit daylight sensitivity as well as a portion of the IR spectrum between 760 nm to 950 nm.

The cockpit lighting that is used in conjunction with NVGs must be such that the pilot can view the instruments while looking under or around NVGs with his unaided eye and must also not degrade the image intensification while looking through the NVGs. Typically, this is achieved by using cockpit light sources that emit light energy with wavelengths from 360 nm to 600 nm (green and blue light) as these wavelengths do not coincide with the NVG spectral sensitivity range (600 nm to 950 nm) and are visible to the naked eye. (See a publication distributed by Jay-El Products, Inc. entitled "Recommendations for Color Limitations of Illuminated Devices Used in Conjunction With AN/AVS-6 Night Vision Goggles" wherein a recommendation is made that only "The colors yellow, green, blue-green, and blue are possible compatible colors for illumination" with NVGs. See also a June 6, 1985 Military Specification (4th draft) entitled "Lighting, Aircraft, Interior, AN/AVS-6 Night Vision Imaging System (ANVIS) Compatible" wherein only Green, Green B and Yellow lighting are specified for compatiblity.)

Typically, cockpits have red warning lights which are believed to be incompatible with NVGs. To eliminate the incompatibility between red warning lights and NVGs, resort has been made to the installation of "flip-up" blue-green filters over the red lights which effectively block the infrared emissions in addition to 40% of the visible emissions. The drawback to this approach is that the "filtered" warning lights no longer draw attention when utilizing NVGs or the unaided eye. Furthermore, the filters must be removed for daytime use.

Thus, there exist a variety of problems associated with the use of NVGs in conjunction with light sources.

Accordingly, there is a continual search in this art for lighting that is compatible with NVGs.

SUMMARY OF THE INVENTION

This invention is directed to red lights that are made compatible with NVGs through the use of filters. The filter(s) transmits at least about 80% of visible light within a range up to about 640 nm and inhibits the transmission of 99.9% of light energy above about 720 nm within the spectral sensitivity of the night vision goggles.

Another aspect of this invention is a night vision goggle compatible red light comprising a light source and a filter(s). The filter(s) transmits the color red and at least about 80% of visible light within a range up to about 640 nm and inhibits the transmission of 99.9% of light energy above about 720 nm within the spectral sensitivity of the night vision goggles.

Yet another aspect of this invention is a night vision goggle compatible red light comprising a red light source filtered by at least one filter. The filter transmits at least about 80% of visible light within a range up to about 640 nm and inhibits the transmission of 99.9% of light energy above about 720 nm within the spectral sensitivity of the night vision goggles.

This invention provides an aircraft cockpit with a night vision goggle compatible red light. Thus, it makes a significant contribution to the aerospace industry.

Other features and advantages will be apparent from the specificiation and claims and from the accompanying drawings which illustrate an embodiment of the invention.

BEST MODE FOR CARRYING OUT THE INVENTION

A typical red light is comprised of a light source (i.e. incandescent, fluorescent) and a filtering medium (i.e. absorbent dye polycarbonate technology) which produces the color red. The filtering medium can comprise a plurality of filters. The color red is defined as aviation red. According to Mil. Spec. 25050, its chromaticity coordinates are: $x \geq 0.663$; $y \leq 0.335$; $z \leq 0.002$. Typically, red light for use on an aircraft control panel is fixed at approximately 150 footlamberts for sunlight readability and is dimmable from 5 footlamberts to 0.1 footlamberts during nighttime operation.

Figure 1:
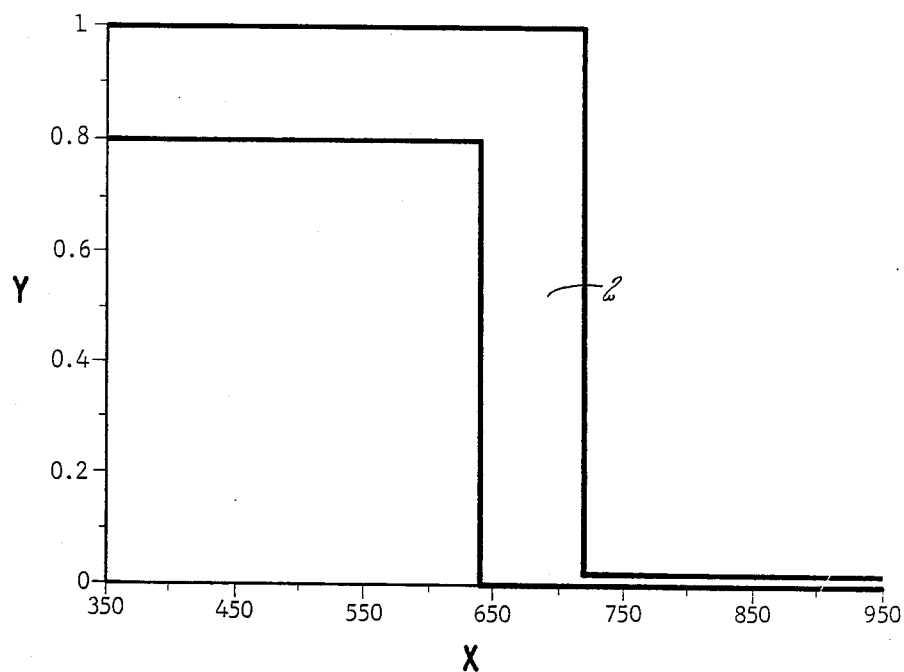
FIG. 1 graphs the range of transmission filters which are acceptable for NVG compatibility.
Figure 2:
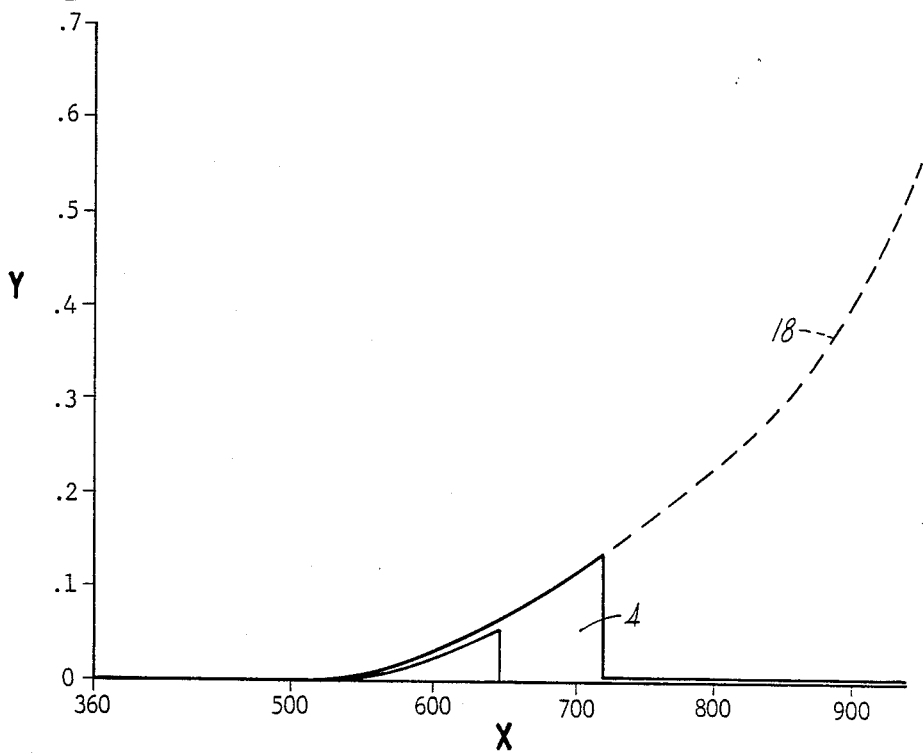
FIG. 2 graphs the spectral emission limits of a compatible red light.

Surprisingly, a red light can be made compatible for use with Night Vision Goggles by utilizing a filter over the above-described source of light. In FIG. 1, the percentage of relative emission of an acceptable filter y is plotted against wavelength (nm) and the filter is graphically represented. The filter transmits about 80% or more of visible red light energy from about 360 nm to about 640 nm and inhibits (absorption or reflection) the transmission of 99.9% of radiant energy within the goggle sensitive range above about 720 nm. The outlined area 2 establishes the bounds of the filter, thus any transmission curve within that area provides NVG compatibility. In FIG. 2, the percentage of relative emission of filtered red light y is plotted against wavelength (nm) x. The spectral emission of red light modified by the filter of this invention is any emission curve within the bounded area 4.

Transmission of 80% or more of visible red light energy below about 640 nm in wavelength provides adequate daylight readability (150 footlambert light source unaided eye viewing) and provides satisfactory readability when night flying (5 to 0.1 footlamberts dimmable light source, unaided eye viewing under or around the goggles).

Transmission within the spectral range of the NVGs (600 nm to 720 nm) allows the red light (e.g. warning light) to be viewable through NVGs. Absorption of the remaining light energy (>720 nm) is essential to prevent the loss of external viewing intensification by the NVGs (i.e., the gain of the NVG is not adversely affected).

Figure 3:
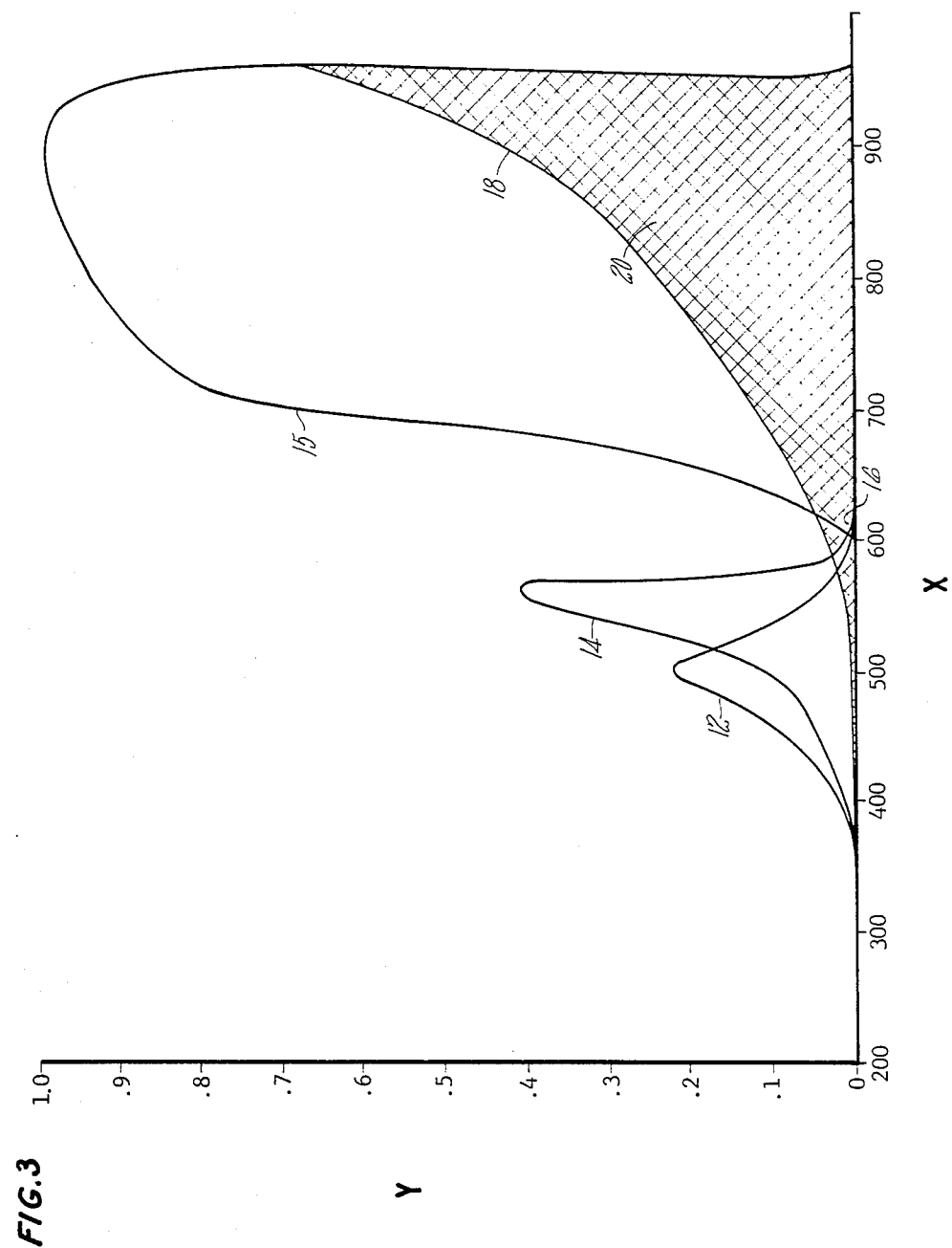
FIG. 3 is a graphical representation of the electromagnetic spectrum in relation to the spectral response of the human eye when utilizing the colors blue, green and red.

A clear understanding of this invention may be had by reference to FIG. 3 which graphs percent relative response y against wavelength (nm) x. As is shown in FIG. 3, blue light 12 and green light 14, do not significantly interact with the NVG image intensification range 15, i.e., they do not generate infrared emissions within the spectral range of the NVGs 15. The area of intersection 16 does not adversely affect the gain of NVGs. However, light sources which generate considerable quantities of infrared emissions, for instance red light 18, are incompatible. The area 20 under curve 18 shows significant interaction with the NVGs which has an adverse effect upon the gain. To better understand the red light incompatibility problem, consider the following analogy.

The high beams of an oncoming automobile are sources of high intensity light. The pupil of the viewer's eye dilates to protect the retina from overexposure. As a result of this, his field of the scene beyond the headlights becomes darkened or unviewable. Similarly, the NVG gain or image intensification decreases when energy levels within its sensitivity (600 nm to 950 nm) are increased. Referring back to FIG. 3, note that the range of red light emission 18 (above 550 nm) is well within the field of NVG sensitivity. Much like the pupil of the eye, the gain NVGs is reduced when red light is present resulting in the diminution of the pilot's vision beyond the cockpit.

This invention provides red lights compatible with NVGs by means of a filter(s) placed over or integrated with a light source which together allow acceptable energy levels to be transmitted within the spectral sensitivity of the goggles.

Figure 4:
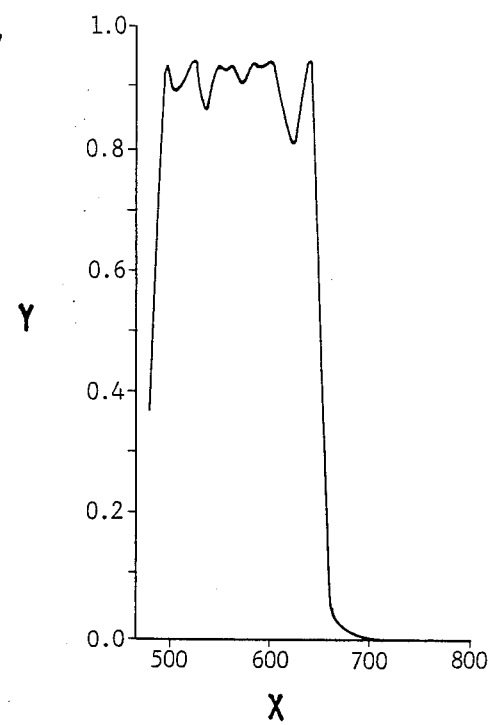
FIG. 4 graphs the actual coordinates of a successfully tested NVG compatible red light filter.

The filtering medium may comprise a combination of conventional interference coatings or absorption dyes. Those skilled in the art will know how to use conventional processes to obtain the filter(s) of this invention. An example of a successful absorption filter is #OXL-720-950 manufactured by Oxley Developments Company, Ltd. located in Cumbria, England, graphically depicted in FIG. 4. In FIG. 4, percent transmission y is plotted against wavelength (nm) x. Another viable absorption filter is #BM-05-AM manufactured by Wamco Inc., Fountain Valley, Calif.

Figure 5:
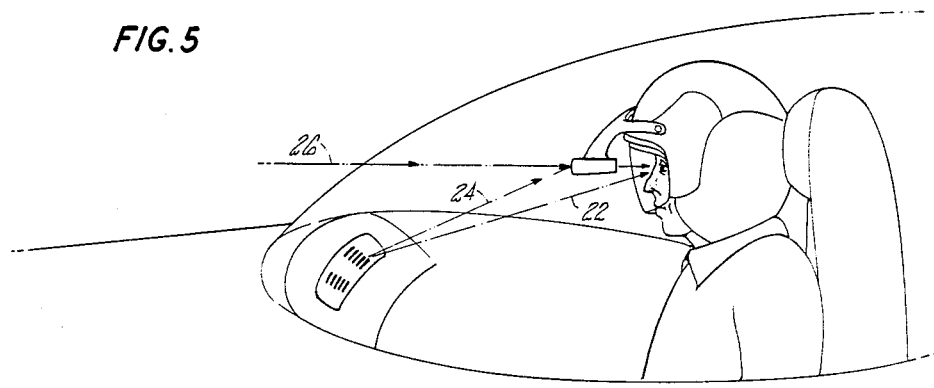
FIG. 5 illustrates a typical arrangement of the night vision imaging system. The goggles are helmet mounted in a binocular arrangement such that the pilot is free to look under and/or around the NVGs to view the instrument panel with his unaided eye.

According to FIG. 5, this NVG compatible light is sunlight readable for daytime use (without NVGs), is nighttime readable by viewing the cockpit instrument panel under the NVGs along line of sight 22 and is sufficiently bright to be attention getting through the NVGs along line of sight 24, yet not degrade a pilot's field of vision beyond, along line of sight 26.

This invention provides an aircraft cockpit that is to be used with NVGs with a greater variety of color content. In addition, the invention permits the continued use of red light in conjunction with NVGs to denote a warning indication. This is most important from a human engineering standpoint as the color red has been inbred not only to aviators but to society as a danger signal. Finally, the invention provides readability for all missions eliminating the cumbersome, noneffective, removable blue-green filters used before.

It should be understood that the invention is not limited to the particular embodiment shown and described herein, but that various changes and modifications may be made without departing from the spirit and scope of this concept as defined by the following claims.

I claim:

1. A method of altering the emission of a light source in an aircraft cockpit, said cockpit having a night vision imaging system which includes a binocular night vision goggle apparatus suitably oriented to permit viewing both under and through said goggle apparatus, said system providing image intensification of light energy in the red and IR regions of the electromagnetic spectrum, wherein said method includes the step of;

filtering said light source to permit compatible viewing thereof while operating said night vision imaging system, wherein said light source is filtered such that at least about 80% of visible light energy is transmitted within a range up to about 640 nm and at least about 99.9% of light energy is inhibited from transmission above about 720 nm.

2. The method for altering the emission of said light source as described in claim 1 further including the step of reducing the magnitude of said light source to between 5 to 0.1 footlamberts during operation of said night vision imaging system.

3. The method for altering the emission of said light source as described in claim 1 further including the step of increasing the magnitude of said light energy to about 150 footlamberts.

* * * * *